United States Patent
Cook et al.

(10) Patent No.: US 9,269,172 B2
(45) Date of Patent: Feb. 23, 2016

(54) PIXEL-BASED VISUALIZATIONS OF TIME SERIES DATA USING HELICES

(71) Applicant: Hewlett-Packard Development Company, L.P., Fort Collins, CO (US)

(72) Inventors: Gregory William Cook, Palo Alto, CA (US); Ming C Hao, Palo Alto, CA (US); Nelson L Chang, San Jose, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 123 days.

(21) Appl. No.: 14/191,420

(22) Filed: Feb. 26, 2014

(65) Prior Publication Data
US 2015/0243058 A1    Aug. 27, 2015

(51) Int. Cl.
*G06T 11/20*    (2006.01)
*G06T 19/20*    (2011.01)

(52) U.S. Cl.
CPC ............... *G06T 11/206* (2013.01); *G06T 19/20* (2013.01); *G06T 2200/24* (2013.01); *G06T 2219/2016* (2013.01)

(58) Field of Classification Search
CPC .... G01N 23/04; G06T 11/006; G06T 11/003; G06T 11/005; G06T 2207/10072; G06T 2207/30048; G06T 2207/30101; G06T 2211/416; G06T 2211/421; G06T 7/0083; G06T 7/0085; G06T 7/0089; G06T 11/206; G06T 17/00; G06T 17/30061; G06T 17/30064; G06T 17/18
See application file for complete search history.

(56) References Cited

U.S. PATENT DOCUMENTS

| 5,917,500 | A | 6/1999 | Johnson et al. |
| 5,986,673 | A | 11/1999 | Martz |
| 7,098,872 | B2 | 8/2006 | Geng |
| 7,502,034 | B2 | 3/2009 | Chemel et al. |
| 2015/0106360 | A1* | 4/2015 | Cao ........................ G06Q 10/00 707/723 |

OTHER PUBLICATIONS

Siripatana et al., The Development of Interactive 3D Spring Visualization for Periodic Multidimensional Direction Time-Series Data Sets, published in proceeding of the 9th International Conference on Electrical Engineering/Electronics, Computer, Telecommunications and Information Technology (ECTI-CON), 2012.*

Hicks, A Helix Metaphor for Customer Behaviour Visualisation, Published in Proceeding of IV '01 Proceedings of the Fifth International Conference on Information Visualisation, 2001, pp. 22-28.*

(Continued)

*Primary Examiner* — Haixia Du
(74) *Attorney, Agent, or Firm* — Hewlett Packard Enterprise Patent Department (57) ABSTRACT

Example embodiments relate to providing pixel-based visualizations of time series data using nested helices. In example embodiments, helix portions in the time series data may be identified according to a measured time interval, where each of the helix portions represents the measured time interval in the time series data. A helical time period may then be determined and used as a helical revolution in a helical pixel representation. At this stage, the helical pixel representation may be generated using the helix portions, where proximate helix portions along a common line parallel to an axis of the helical pixel representation are chronologically separated by the helical time period.

15 Claims, 10 Drawing Sheets
(3 of 10 Drawing Sheet(s) Filed in Color)

(56) References Cited

OTHER PUBLICATIONS

Mitsue et al., A 3D Visualization System for Real-Time Space Weather Simulator with a Glassless Stereoscope, Journal of the National Institute of Information and Communications Technology, vol. 53 No. 1, 2006, pp. 151-157.*

C. Tominski, "3D Information Visualization for Time Dependent Data on Maps," Jul. 6, 2005, http://www.informatik.uni-rostock.de/~ct/pub_files/Tominski05AxesBasedVis3D_talk.pdf.

D. Keefe, "Exploratory Visualization of Animal Kinematics Using Instantaneous Helical Axes," Feb. 1, 2008, http://citeseerx.ist.psu.edu/viewdoc/download?doi=10.1.1.160.5158&rep=rep1&type=pdf.

J. Kehrer, "Visualization and Visual Analysis of Muiti-faceted Scientific Data: a Survey," Apr. 13, 2012, http://www.cg.tuwien.ac.at/research/publications/2013/Kehrer-2013-STAR/Kehrer-2013-STAR-Draft.pdf.

* cited by examiner

PIXEL-BASED VISUALIZATIONS OF TIME SERIES DATA USING HELICES

BACKGROUND

Pixel-based representations of data allow for large data sets to be represented in a graphically efficient manner. For example, time series data may be represented in a two dimensional (2D) pixel calendar tree that subdivides the data into calendar elements. In this example, each pixel within the representation may represent a portion of the time series data for a period of time (e.g., hour, day, week, etc.). Such pixel-based representations may be used to determine patterns and anomalies in the data sets.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The following detailed description references the drawings, wherein.

DETAILED DESCRIPTION

As detailed above, pixel-based representations allow for a large amount of information to be more efficiently displayed. Because each pixel represents a portion of time series data for a time period, a color mapping allows for the pixel-based representation to convey a characteristic (e.g., power consumption, average temperature, stock price, etc.) of the portion of time series data that is easily comparable to neighboring and related pixels. Accordingly, the pixel-based representation allows a viewer to quickly identify anomalies (e.g., a spike in power consumption, a sudden increase in average temperature, a sudden decrease in a stock price, etc.) and trends (e.g., increase power consumption during the same day of the week, increased average temperature during the weekdays, consistent changes in value after quarterly reports, etc.).

Example embodiments disclosed herein provide pixel-based visualizations of time series data by the data's sequence in a three-dimensional space based on a helical path. In these visualizations, a pixel represents a measurement interval (e.g., one minute interval), and the color of the pixel represents the value of a measurement. For example, a multiple helix (e.g., double helix, triple helix, etc.) where the starting points are offset in phase, herein referred to as a tuplex, can be used to represent multiple data sources. In other examples, a superhelix can be used to represent two periodicities while a hyperhelix can used to represent three periodicities, where these visualizations can be extended to their corresponding tuplex versions. Time intervals may be aligned in both the basic and higher order helices for users to easily detect periodic patterns in a large volume of time series data. Further, users may be provided with the ability to interact with the visualization, including changing camera viewpoint, pose of the model, and interrogating the visualization to discover the underlying data. Because of the regularity of the helix, it is possible to take a three dimensional (3D) coordinate and find the corresponding data point. Further, stereoscopic representation can be used to distinguish the depth of the various helices and allow faster comprehension of the spatial alignments.

In some embodiments, helix portions in the time series data may be identified according to a measured time interval, where each of the helix portions represents the measured time interval in the time series data. A helical time period may then be determined and used as a helical revolution in a helical pixel representation. At this stage, the helical pixel representation may be generated using the helix portions, where proximate helix portions along a common line parallel to an axis of the helical pixel representation are chronologically separated by the helical time period.

In this manner, example embodiments disclosed herein provide pixel-based visualizations of time series data using helices by representing time series data as pixels in helical patterns that provide users with a temporal context for the helical representations.

Figure 1:
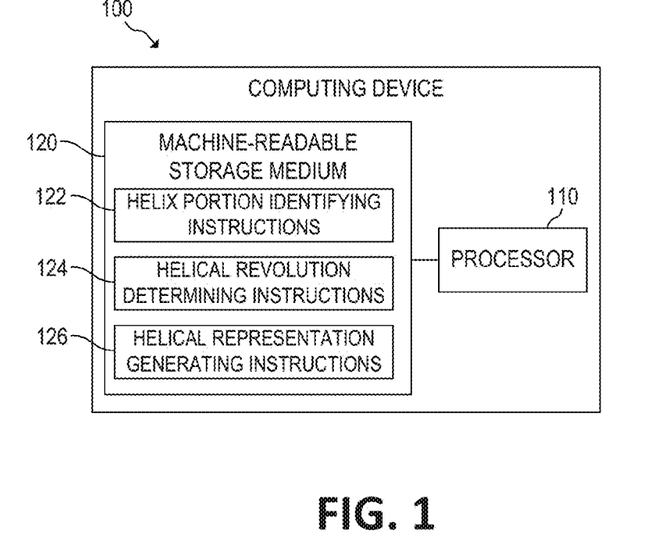
FIG. 1 is a block diagram of an example computing device for providing pixel-based visualizations of time series data using helices.

Referring now to the drawings, FIG. 1 is a block diagram of an example computing device 100 for providing pixel-based visualizations of time series data using helices. Computing device 100 may be any computing device (e.g., smartphone, tablet, laptop computer, desktop computer, etc.) capable of processing time series data as described below. In the embodiment of FIG. 1, computing device 100 includes a processor 110 and a machine-readable storage medium 120.

Processor 110 may be one or more central processing units (CPUs), microprocessors, and/or other hardware devices suitable for retrieval and execution of instructions stored in machine-readable storage medium 120. Processor 110 may fetch, decode, and execute instructions 122, 124, 126 to enable pixel-based visualizations of time series data using helices, as described below. As an alternative or in addition to retrieving and executing instructions, processor 110 may include one or more electronic circuits comprising a number of electronic components for performing the functionality of one or more of instructions 122, 124, 126.

Machine-readable storage medium 120 may be any electronic, magnetic, optical, or other physical storage device that stores executable instructions. Thus, machine-readable storage medium 120 may be, for example, Random Access Memory (RAM), an Electrically-Erasable Programmable Read-Only Memory (EEPROM), a storage drive, an optical disc, and the like. As described in detail below, machine-readable storage medium 120 may be encoded with executable instructions for providing pixel-based visualizations of time series data using helices.

Helix portion identifying instructions 122 may identify helix portions in time series data according to a measured time interval. For example, time series data may be historical data such as stock prices, stock sale volume, price differential, etc. In another example, time series data may be collected from sensors installed at various locations in a building. Each of the sensors may be associated with a region (e.g., room, hallway, floor, wing, etc.) of the physical infrastructure of the building and used to collect time series data at regular intervals in real-time. In this example, the helix portions may be identified as portions of the time series data according to the measured time interval (i.e., the time series data may be subdivided into helix portions that each represent data for a time interval).

Helical revolution determining instructions 124 may identify helical time period(s) for representing the helix portions in helical revolution(s). For example, the helical time periods may be provided by a use of computing device 100, where the provide time period(s) are then used to determine how to determine how the helix portions should be organized within the helical revolution(s). Specifically in this example, helical revolution determining instructions 124 may determine how many helix portions should be included in each helical revolution (e.g., if the helical time period is seven days and each helix portion represents an hour, each helical revolution may include a pixel for 168 helix portions). Helical revolution determining instructions 124 may also determine how best to position the helix portions in three-dimensional (3D) space within the helical revolutions.

A helix is a curve in three-dimensional space, where the tangent line at any point of the curve makes a constant angle with an axis of the helix. Examples of helices include, but are not limited to, circular helices, conic helices, cylindrical helices, generalized helix, etc. A helical revolution refers to a single revolution of a helix with respect to the axis of the helix. For example, a coil spring is a helix where each ring in the spring can be considered a helical revolution.

Helical representation generating instructions 126 generates a helical pixel representation that includes the helix portions arranged within the helical revolutions. Specifically, the helical pixel representation represents the helix portions arranged in a helix with helical revolutions as described above. Each of the helical revolutions includes the helix portions that are associated with a helical time period. Accordingly, the helix portions on a common line parallel to an axis of the helix are for the same subset of the helical time period (e.g., if the helical time period is a month, each helix portion on a common line parallel to the axis can be associated with the first day of the month). The color of each helix portion in the helical pixel representation provides an indication of the relative value of a measured property of the time series data such as stock volume, price differential, temperature, etc. In some cases, the helical pixel representation allows the user to move the viewpoint of the camera or the pose of the helix to allow different portions of the calendar to be viewed by the user.

Alternatively in other cases, the axis of the helical pixel representation is not a straight line but rather can be a curved line such as a circle, a Bezier curve, a helix, etc. In these cases, the helical pixel representation can, for example, take the form of a torus with a circle axis, a Bezier curve with a Bezier axis, a superhelix with a helix axis, etc. If the axis is a curved line, the common line used by the user for performing temporal comparisons is similarly curved.

Figure 2:
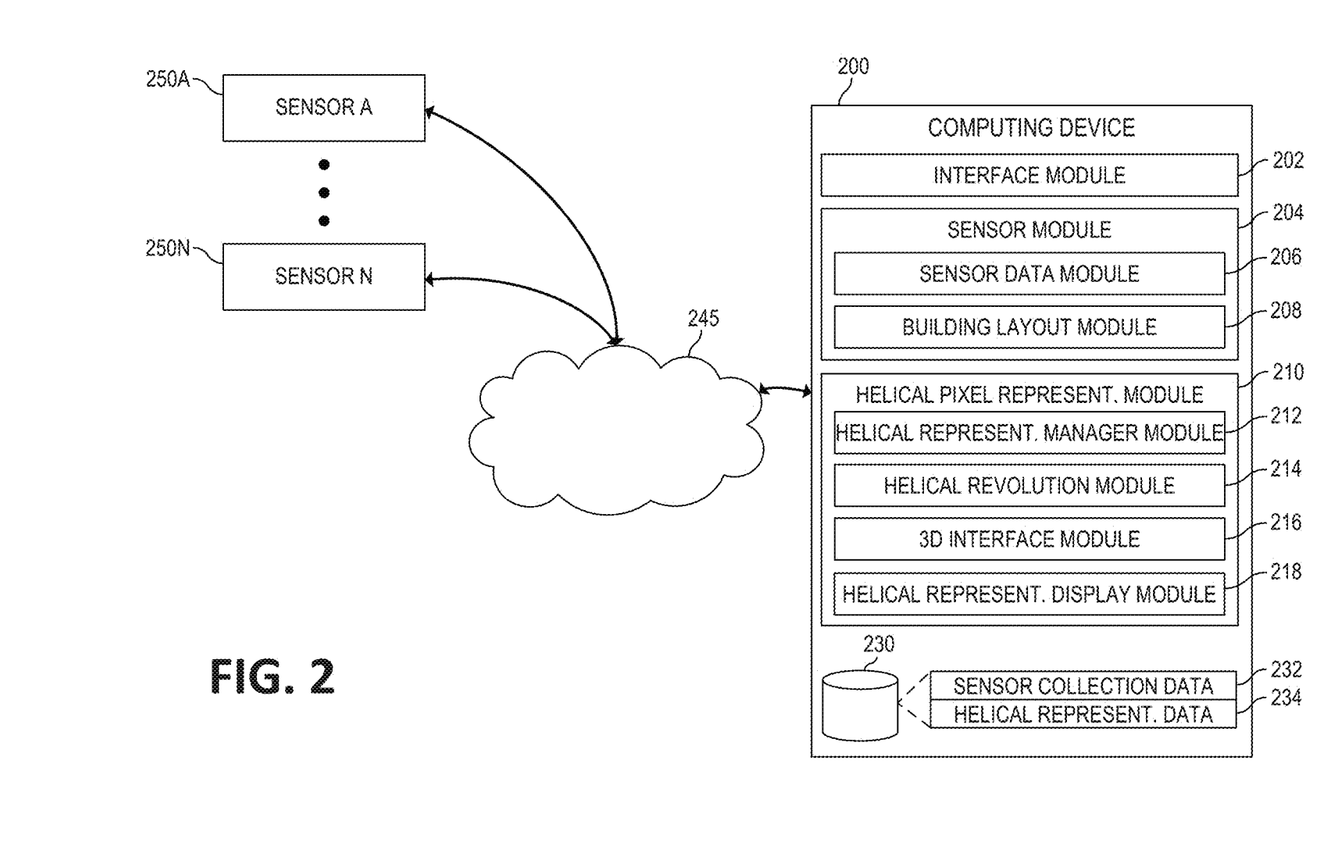
FIG. 2 is a block diagram of an example computing device in communication with sensors for providing pixel-based visualizations of time series data using helices.

In either scenario, time series data may be rendered as pixels within the helical pixel representation, where each pixel represents time series data of a particular time interval. Further, each pixel may be color coded based on the value of the time series data. For example, high power consumption during a time interval may be rendered as a red pixel while low power consumption during a time interval may be rendered as a violet pixel. Further, each pixel may be offset in 3D from the helical path position based on the value of the time series data. For example, pixels may be offset vertically if the power consumption were due to heating/air conditioning and tangentially if due to data center consumption, FIG. 2 is a block diagram of an example computing device 200 in communication via a network 245 with sensors (e.g., sensor A 250A, sensor N 250N). As illustrated in FIG. 2 and described below, computing device 200 may communicate with sensors to provide pixel-based visualizations of time series data using helices.

As illustrated, computing device 200 may include a number of modules 202-218. Each of the modules may include a series of instructions encoded on a machine-readable storage medium and executable by a processor of the computing device 200. In addition or as an alternative, each module may include one or more hardware devices including electronic circuitry for implementing the functionality described below.

As with computing device 100 of FIG. 1, computing device 200 may be a notebook, desktop, tablet, workstation, mobile device, or any other device suitable for executing the functionality described below. As detailed below, computing device 200 may include a series of modules 202-218 for pixel-based visualizations of time series data using helices.

Interface module 202 may manage communications with the sensors (e.g., sensor A 250A, sensor N 250N). Interface module 202 may include a number of electronic components for communicating with sensors (e.g., sensor A 250A, sensor N 250N). For example, interface module 202 may include an Ethernet interface, a Universal Serial Bus (USB) interface, an IEEE 1394 (Firewire) interface, an external Serial Advanced Technology Attachment (eSATA) interface, or any other physical connection interface suitable for communication with the sensors. Alternatively, interface module 202 may include a wireless interface, such as a wireless local area network (WLAN) interface or a near-field communication (NFC) interface. In operation, as detailed below, interlace module 202 may be used to send and receive data, such as sensor collection data 232, to and from corresponding interfaces of sensors.

Sensor module 204 may manage sensor data obtained from the sensors (e.g., sensor A 250A, sensor N 250N) and other sources. Sensor data module 206 may process sensor data received from the sensors (e.g., sensor A 250A, sensor N 250N), The sensor data may include measurements (e.g., power consumption, temperature, etc.) collected by the sensors (e.g., sensor A 250A, sensor N 250N) at regular intervals. The sensor data may also include an identifier (e.g., numeric identifier, alpha-numeric identifier, globally unique identifier, etc.) that is associated with the related sensor (e.g., sensor A 250A, sensor N 250N) providing the sensor data. In this manner, sensor data module 206 may continually receive sensor data from the sensors (e.g., sensor A 250A, sensor N 250N) and compile the sensor data into time series sensor data that is stored as sensor collection data 232 in storage device 230. The time series sensor data may include data records for the measurements taken during each interval so that the time series sensor data may be incorporated into a pixel calendar.

Sensor data module 206 may also generate summary information for each of the sensors (e.g., sensor A 250A, sensor N 250N) based on the sensor data. For example, sensor data module 206 may determine the cumulative power consumption of a power meter over an extended period of time (e.g., a day, a week, a month, etc.). The summary information may be linked to an identifier associated with the power meter in the sensor collection data 232 of storage device 230 so that the summary information may be used by the helical pixel representation module 210. In some cases, sensor data module 206 may receive the sensor data at regular intervals in realtime. Alternatively, the sensors (e.g., sensor A 250A, sensor N 250N) may store sensor data collected at regular intervals and transmit the sensor data on a less regular basis (e.g., daily, weekly, monthly, etc.). Sensor data may be collected by various types of sensors such as power meters, thermometers, light sensors, etc.

Building layout module 208 may manage a building layout associated with the sensors (e.g., sensor A 250A, sensor N 250N). For example, power consumption data may be received from power meters installed at various locations in a building. Each of the sensors may be associated with a region (e.g., room, hallway, floor, wing, etc.) of the physical infrastructure of the building and arranged in a building layout.

Alternatively, in other cases where the time series data is not obtained from sensors, computing device 200 may not include or use sensor module 204 as described above and sensors 250A, 250N can be similarly excluded from the system shown in FIG. 2. In these cases, the time series data may be obtained from other sources such as operational, IT, or security log files.

Helical pixel representation module 210 may manage pixel calendar trees that are generated based on time series data (e.g., historical data, sensor data as described above). Although the components of helical pixel representation module 210 are described in detail below, additional details regarding an example implementation of module 210 are provided above in connection with instructions 122, 124, and 126 of FIG. 1.

Figure 5:
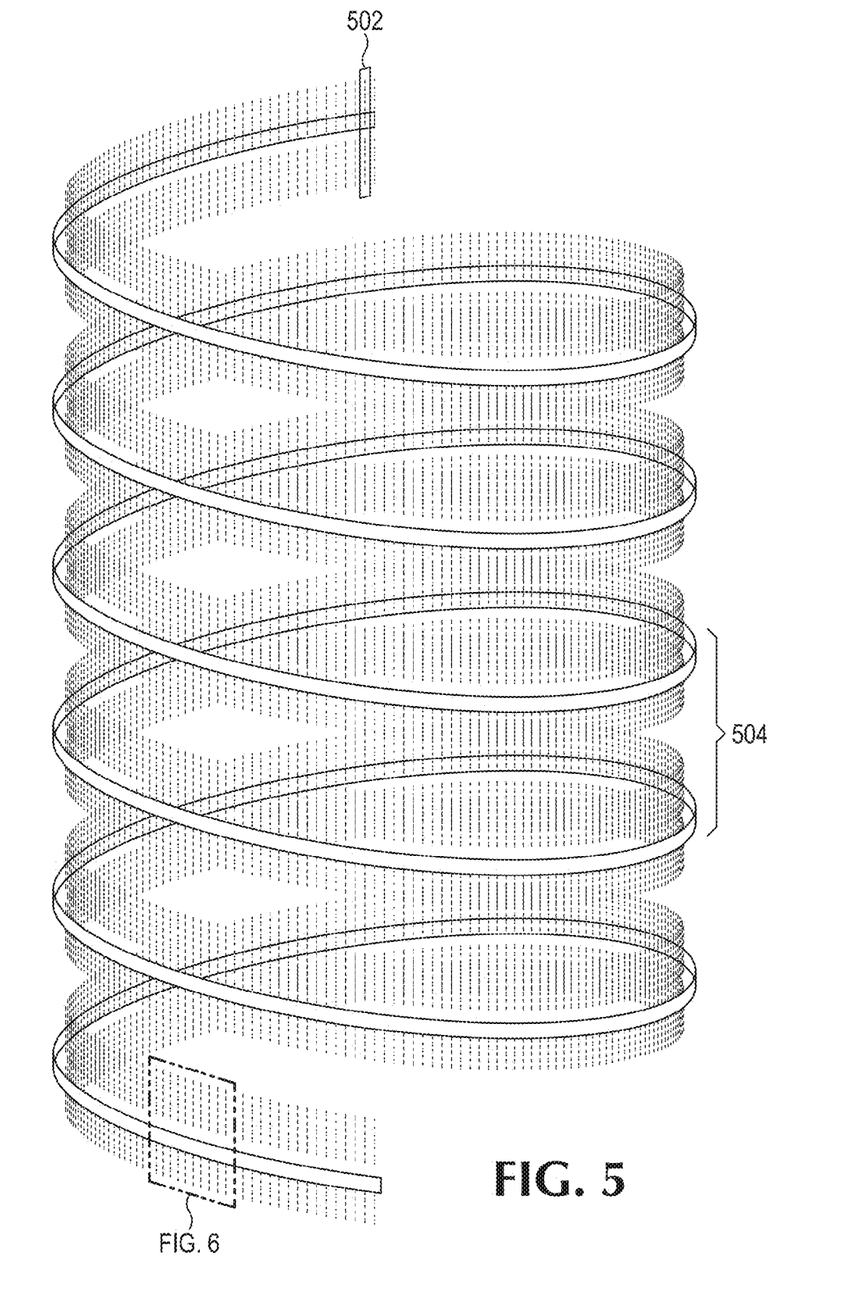
FIG. 5 is an example tuplex pixel representation including time series data.
Figure 7:
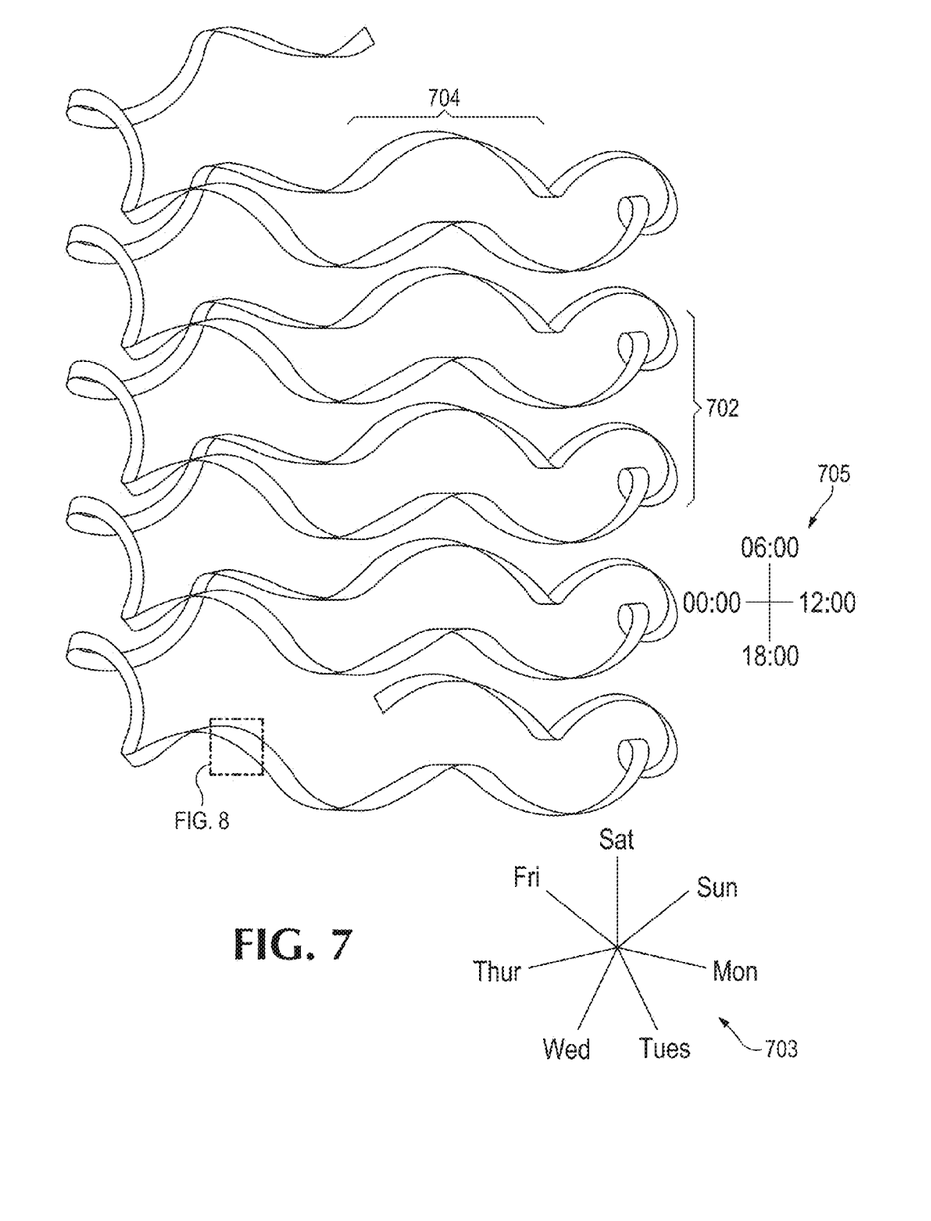
FIG. 7 is an example supertuplex pixel representation including time series data.

Helical representation manager module 212 may generate helical pixel representations based on time series data and helical time periods. Specifically, helical representation manager module 212 may use a helical time period associated with a helical revolution (e.g., as described below with respect to helical revolution module 214) to position the time series data in 3D space to generate a helical pixel representation. Depending on the number of helical time periods and characteristics in the time series data, the helical pixel representation may take the form of various helical structures such as a tuplex or supertuplex. For example, a tuplex such as shown in FIG. 5 may include multiple helices that represent different characteristics, where the relative value of the characteristic are represented by colored pixels within the helixes. In this example, the tuplex includes a single helical revolution that corresponds to a helical time period that allows for values on the same axis to be easily compared (e.g., values on the same axis correspond to the last day of the time period, etc.). In another example, a supertuplex such as shown in FIG. 7 may include twisting helices that each represent different characteristics, where the twist represents a first helical time period (e.g., hours in a day) and the helical revolution represents a second helical time period (e.g., days in a week). In both examples, helical revolutions allows time series data to be offset spatially to facilitate temporal comparisons. The generated helical pixel representations may be stored as helical representation data 234 in storage device 230.

Helical revolution module 214 may determine the helical revolution(s) to apply to a helical pixel representation. The helical revolution corresponds to a helical time period such as hours in a day, days in a week, days in a month, etc. In this case, the helical revolution is determined as the helical curve in 3D space to accommodate a frequency of time series data in the helical time period. For example, if the time series data is collected in hourly intervals and the helical time period is hours in a day, helical revolution module 214 determines the best fit for 24 portions of time series data in the helical curve such that the individual time series may be represented as pixels. In this example, the helical curve used may be a function of the number of intervals in the time series data per helical time period.

3D interface module 216 may allow a user to interact with a helical pixel representation in 3D space. For example, 3D interface module 216 may provide functionality to allow the user to (1) pan or move the helical pixel representation in 3D space and/or (2) zoom or move the camera view in 3D space. In this example, the helical pixel representation may be generated by helical representation manager module 212 as a 3D model that can be rendered in 3D space.

Helical representation display module 218 may render helical pixel representations for display on a display device (not shown) of computing device 200. The display of the helical pixel representation may allow the user to select areas of interest in the representation. For example, user interlace elements may be provided along with a display of the helical pixel representation, where the user interface elements allow the user to collect input for the 3D interface module 216 or to select a period of time (e.g., hours, days, weeks, etc.) in the helical pixel representation as the interested area. Helical representation display module 216 may also allow the user to specify parameters for a requested visual relation query for the selected area of interest.

In some cases, helical representation display module 218 is configured to render helical pixel representations in a stereoscopic format. Specifically, the stereoscopic format creates the illusion of depth in a rendering of a helical pixel representation by using two slightly different images of the representation. The stereoscopic renderings may be viewed by the user using 3D viewer technology such as shutter or polarized glasses. Alternatively to 3D viewer technology, other techniques such as autostereoscopy or holography can also be used to present a different image to each eye to allow for the stereoscopic effect.

Time series data may be rendered as pixels within the helical pixel representation, where each pixel represents time series data for a time interval. Further, each pixel may be color coded based on the value of the time series data. For example, high power consumption during a time interval may be rendered as a red pixel while low power consumption during a time interval may be rendered as a violet pixel. Examples of rendered pixel calendar trees are described below with respect to FIGS. 5-8.

Storage device 230 may be any hardware storage device for maintaining data accessible to computing device 200. For example, storage device 230 may include one or more hard disk drives, solid state drives, tape drives, and/or any other storage devices. The storage devices 230 may be located in computing device 200 and/or in another device in communication with computing device 200. As detailed above, storage device 230 may maintain sensor collection data 232 and helical representation data 234.

Sensors (e.g., sensor A 250A, sensor N 250N) may be any sensor device operatively connected to computing device 200 over the network 245 that is suitable for collecting measurements of characteristics (e.g., power consumption, temperature, etc.) related to a building. Sensors (e.g., sensor A 250A, sensor N 250N) may provide time series data that includes measurements collected at regular intervals.

FIGS. 1 and 2 illustrate example computing devices 100, 200 for providing pixel-based visualizations of time series data using helices. The functionalities described above may be provided in various configurations. For example, functionality provided by the modules 202-218 of computing device 200 may be implemented as different modules that provide the same or similar functionality and/or distributed over multiple computing devices.

Figure 3:
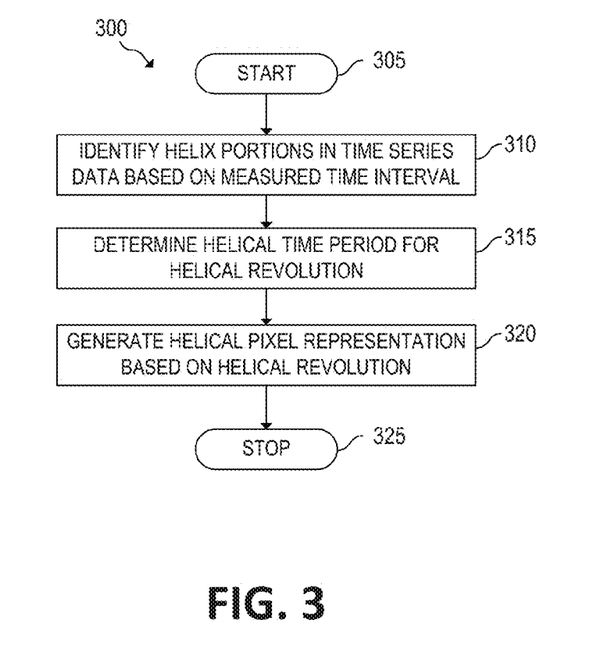
FIG. 3 is a flowchart of an example method for execution by a computing device for providing pixel-based visualizations of time series data using helices.

FIG. 3 is a flowchart of an example method 300 for execution by a computing device 100 for providing pixel-based visualizations of time series data using helices. Although execution of method 300 is described below with reference to computing device 100 of FIG. 1, other suitable devices for execution of method 300 may be used, such as computing device 200 of FIG. 2. Method 300 may be implemented in the form of executable instructions stored on a machine-readable storage medium, such as storage medium 120, and/or in the form of electronic circuitry.

Method 300 may start in block 305 and continue to block 310, where computing device 100 may identify helix portions in the time series data based on a measured time interval. The measured time interval may correspond to the interval of time used during the initial collection of the time series data, For example, power consumption data may be collected hourly to create time series data. In another example, stock prices may be monitored at regular time intervals to create time series data. In block 315, a helical time period is determined for a helical revolution. The helical revolution is the revolution of a helical curve around an axis, where the helical time period corresponds to the time period between adjacent pixels on a common line that is parallel to the axis. For example if the helical time period is a day, pixels on a common line may represent time series data during the same hour of the day (e.g., 1:00 a.m. on day one, 1:00 a.m. on day two, etc.).

In other cases, the helical curve generated around the axis may have a variable radius such as in a conic helix or a generalized helix. Further, alternative helical representations may allow for temporal comparisons to be performed based on visual cues other than the common line described above. For example, time series data may be presented with respect to positions along the helical curve, etc.

In block 320, a helical pixel representation of the times series data is generated based on the helical revolution. Specifically, pixels representing the time series data may be arranged in a helical curve with the helical revolution. Because each helical revolution in the helical pixel representation spans the helical time period, time series data in the same time period can be easily compared by the user.

Figure 4:
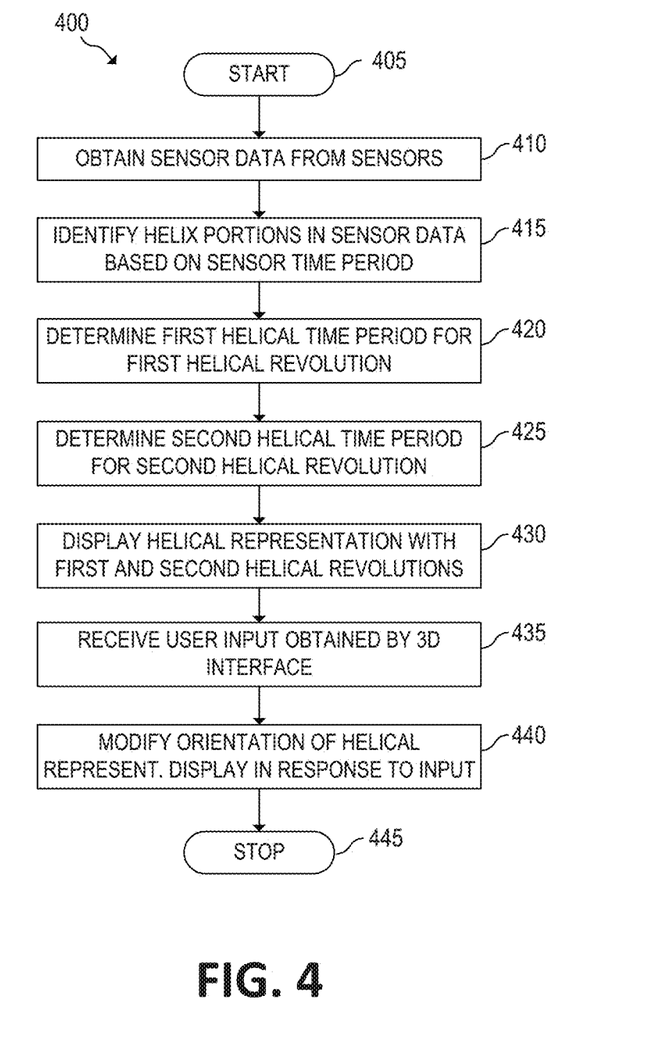
FIG. 4 is a flowchart of an example method for execution by a computing device for providing pixel-based visualizations of time series data using nested helices.

FIG. 4 is a flowchart of an example method 400 for execution by a computing device 200 for providing pixel-based visualizations of time series data using multiple helices. Although execution of method 400 is described below with reference to computing device 200 of FIG. 2, other suitable devices for execution of method 400 may be used, such as computing device 100 of FIG. 1. Method 400 may be implemented in the form of executable instructions stored on a machine-readable storage medium and/or in the form of electronic circuitry.

Method 400 may start in block 405 and continue to block 410, where computing device 200 obtains sensor data from sensors. For example, power consumption data may be obtained from power meters in the building. In this example, the power meters may collect power consumption data at regular intervals for transmitting to the computing device 200. In block 415, a first helical time period is determined for a first helical revolution.

In block 420, a second helical time period is determined for a second helical revolution. For example, multiple time periods and revolutions can be used to generate a superhelix as described below with respect to FIG. 7. In this case, the first helical time period may correspond to helical revolutions of a helical curve around an axis, and the second helical time period may correspond to a twist in the helical curve. This example representation allows the user to perform a distinct temporal comparisons for each of the different time periods (e.g., comparing hours in a day while also being able to compare days in a week). In this example at any point along the helical curve, the second helical revolution revolves around a second axis that is tangent to the path of the first helical revolution.

In some cases, the helical representation used to present the time series data may vary based on the temporal bounds of the dataset. For example, a dataset may initially be presented as described above with respect to FIG. 3, but after a minimum threshold for the temporal bounds (e.g., greater than three weeks of data, greater than a quarter of data, etc.), the representation of the data may be created as described with respect to the helical presentation of FIG. 4. In other words, the presentation of the time series data may automatically evolve over time as the size of the dataset grows.

In block 430, a helical pixel representation of the times series data is generated based on the helical revolutions. Specifically, pixels representation the time series data may be arranged in a helical curve that includes the helical revolutions. In block 435, user input obtained by a 3D interface is obtained. The user input may request a modification of the display pixel representation or a camera viewpoint (e.g., pan, zoom, rotate, etc.). In block 440, the display of the helical pixel representation is modified in response to the user input. For example, the axis of the first helical revolution may be modified based on the user input to move the helical pixel representation in 3D space. Method 400 may then continue to block 445, where method 400 may stop.

FIG. 5 is an example tuplex pixel representation including time series data. The tuplex pixel representation shows pixels 502 that represent values in the time series data. In this example, multiple characteristics are represented in the pixels 502, which are described in more detail below with respect to FIG. 6. For example, multiple characteristics of stock sales (e.g., stock price, sale volume, etc.) can be represented in the pixels. The tuplex pixel representation shows helical revolution 504 for a helical time period. The helical time period may be a fixed time period (e.g., day, week, month, etc.) that is evenly divided between the pixels 502 included in a particular helical revolution. In this manner, the user may temporally compare pixels 502 on a same axis (e.g., compare pixels for the same hour of the day, same day of the week, etc.). A portion of FIG. 5 is shown as the bounds of FIG. 6, which is described below.

Figure 6:
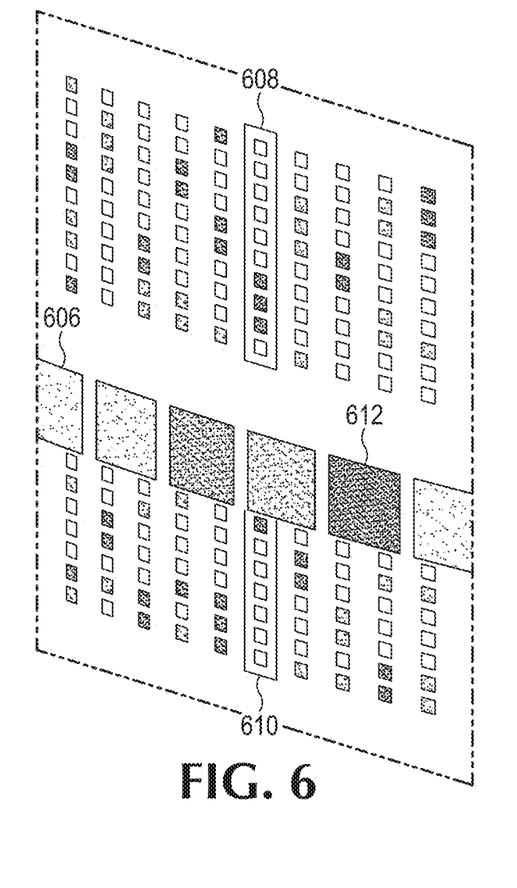
FIG. 6 shows a detailed view of the tuplex pixel representation of FIG. 5.

FIG. 6 shows a detailed view of the tuplex pixel representation of FIG. 5. In FIG. 6, the pixels (502 of FIG. 5) of tuplex pixel representation include summary pixels 606, first characteristic pixels 608, and second characteristic pixels 610. For example, first characteristic pixels 608 may represent stock prices, second characteristic pixels 610 may represent sale volume, and summary pixels 606 may be a combined function of stock prices and sale volume. The detailed view also includes an anomaly 612 that may be identified by the user as an unexpected event that should be investigated further. In this case, the user may use the first and second characteristic pixels 608, 610 to determine the nature of the unexpected event (e.g., stock price rally, sale volume surge, etc.).

FIG. 7 is an example supertuplex pixel representation including time series data. The supertuplex pixel representation includes multiple helical revolutions 702, 704. In this example, first helical revolution 702 is associated with a helical time period of one week as shown in the days in the week legend 703, and the second helical revolution 704 is associated with a helical time period of one day as shown in the hours of the day legend 705. In this case, the user may temporally compare pixels on a common line parallel to the axis as occurring on the same day of the week and also temporally compare pixels on a tangent axis of the supertuplex curve as occurring in the same hour of the day. A portion of FIG. 7 is shown as the bounds of FIG. 8, which is described below.

Figure 8:
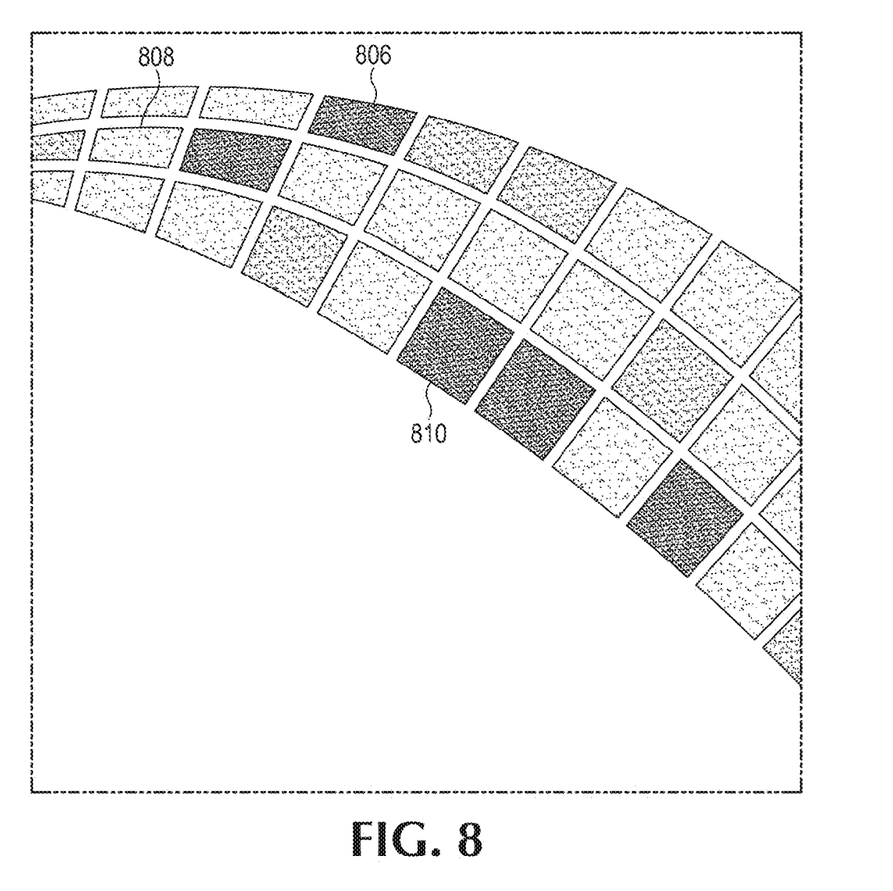
FIG. 8 shows a detailed view of the supertuplex pixel representation of FIG. 7.

FIG. 8 shows a detailed view of the supertuplex pixel representation of FIG. 7. In FIG. 8, the pixels of supertuplex pixel representation first characteristic pixels 806, second characteristic pixels 808, and third characteristic pixels 810. Each of the characteristic pixels 806, 808, 810 may represent a distinct characteristic of time series data. Third characteristic pixel 810 shows a potential anomaly in the time series data that the user may wish to investigate. The supertuplex pixel representation allows the user to determine values of multiple characteristics 806, 808, 810 at the anomaly as well as perform the temporal comparisons described above with respect to FIG. 7.

Figure 9:
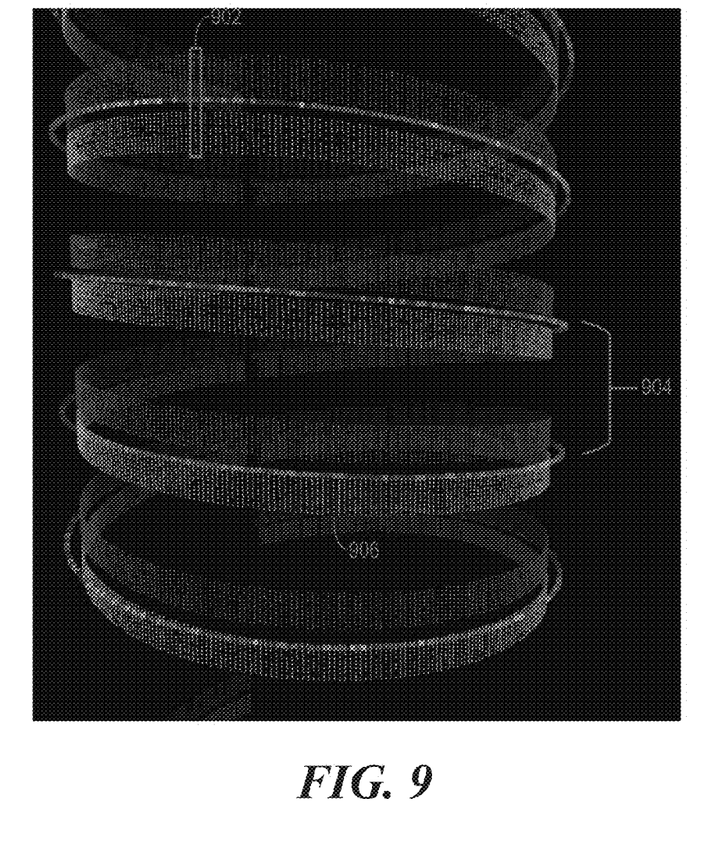
FIG. 9 is an example tuplex pixel representation including time series data in color.

FIG. 9 is an example tuplex pixel representation including time series data in color that is similar to the representation shown in FIG. 5. The tuplex pixel representation shows pixels 902 that represent values in the time series data in color. In this example, multiple characteristics are represented in the pixels 902, where different characteristics may use different color schemes so that the characteristics can be distinguished. For example, stock prices can be represented as pixels in a color gradient from green to red while sale volume can be represented as pixels in a color gradient from light-blue to dark-blue. The tuplex pixel representation shows helical revolution 904 for a helical time period. The tuplex also includes an anomaly 906 that is shown as a sudden change in color in the pixels.

Figure 10:
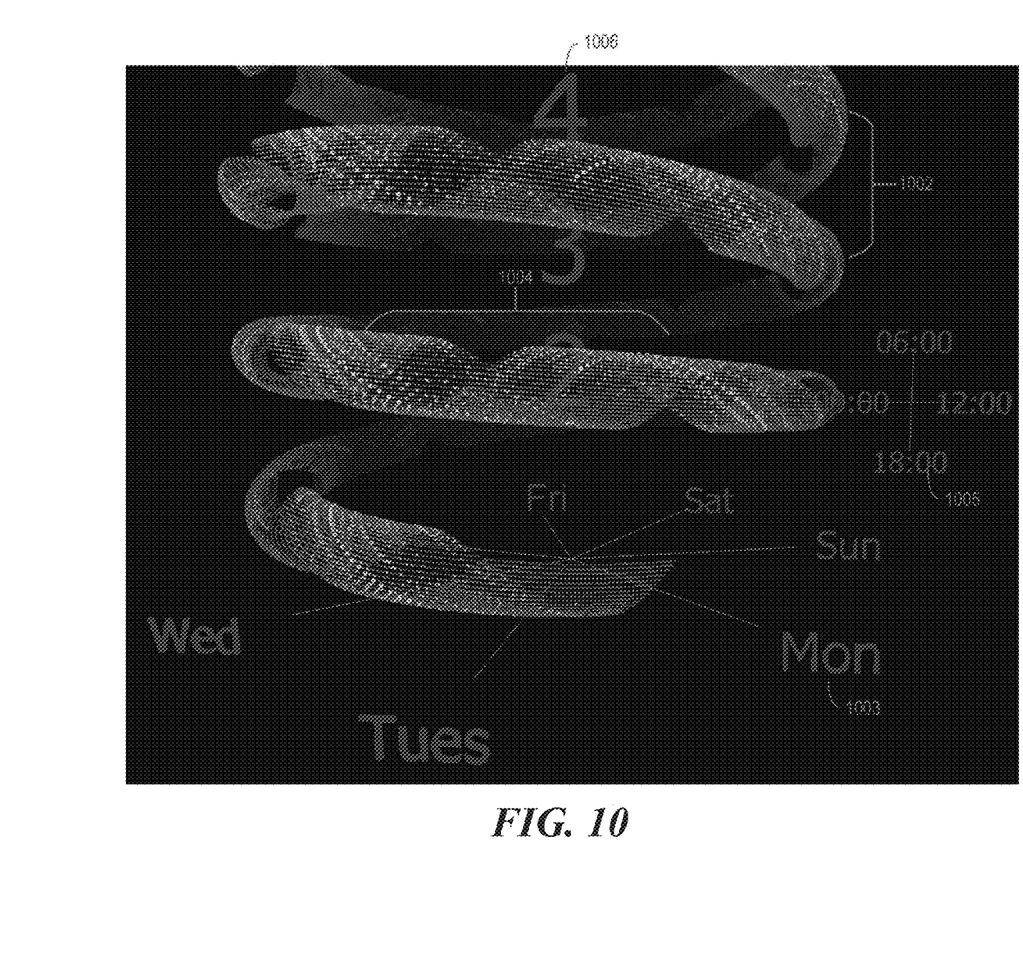
FIG. 10 is an example supertuplex pixel representation including time series data in color.

FIG. 10 is an example supertuplex pixel representation including time series data in color that is similar to the representation shown in FIG. 7. The supertuplex pixel representation includes multiple helical revolutions 1002, 1004. In this example, first helical revolution 1002 is associated with a helical time period of one week as shown in the days in the week legend 1003, and the second helical revolution 1004 is associated with a helical time period of one day as shown in the hours of the day legend 1005. Further, a week count 1006 that identifies which week is represented in an adjacent revolution is also shown along the axis of the supertuplex. Similar to as described above with respect to FIG. 9, the supertuplex is able to represent multiple characteristics, where each characteristic may use a distinct color ramp to distinguish it from the other characteristics.

Figure 11:
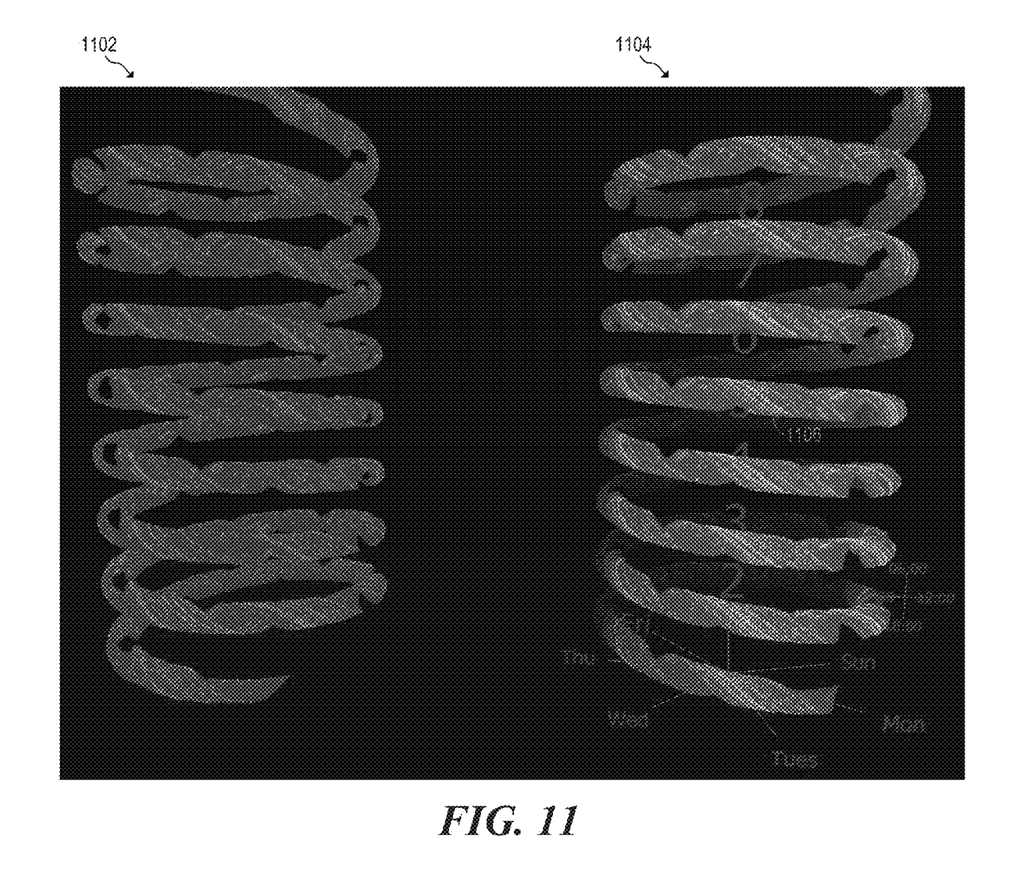
FIG. 11 is an example supertuplex pixel representation including time series data for multiple datasets in color.

FIG. 11 is an example supertuplex pixel representation including time series data for multiple datasets in color. The representation includes two supertuplexes 1102, 1104 that are each similar to the supertuplex described above with respect to FIG. 10. Each of the supertuplexes 1102, 1102 can represent the same characteristics from two different data sets. For example, supertuplex 1102 can include time series data from a first quarter of a year while supertuplex 1104 can include time series data from a second quarter. This allows distinct data sets to be compared in adjacent renderings while still allowing for the temporal comparisons described above. Supertuplex 1104 includes an anomaly 1106 that is shown as a sudden change in color in the pixels of supertuplex 1104, where the user can temporally compare the anomaly 1106 to other timer series data in either of the supertuplexes 1102, 1104.

The foregoing disclosure describes a number of example embodiments for providing pixel-based visualizations of time series data using helices. In this manner, the embodiments disclosed herein enable time series data to be represented as pixels in helical patterns that provide users with a temporal context for the helical representations.

We claim:

1. A system for providing pixel-based visualizations of time series data using helices, the system comprising:
   a processor to:
   identify a plurality of helix portions in the time series data according to a measured time interval, wherein each of the plurality of helix portions represents the measured time interval in the time series data;
   determine a helical time period to represent a sub-plurality of the helix portions in a helical revolution in a helical pixel representation, wherein the helical revolution is based on a number and position of the sub-plurality of the helix portions; and
   generate the helical pixel representation using the plurality of helix portions, wherein proximate helix portions of the plurality of helix portions along a common line parallel to a first axis of the helical pixel representation are chronologically separated by the helical time period.

2. The system of claim 1, wherein the processor is further to modify an orientation of the first axis of the helical pixel representation in response to user input that is obtained by a three-dimensional (3D) user interface.

3. The system of claim 1, wherein the processor is configured to generate the helical pixel representation using the plurality of helix portions by:
   determining a second axis of the helical pixel representation that is tangent to a path of the helical revolution and associated with a second time period, wherein axially proximate helix portions of the plurality of helix portions with respect to the second axis are chronologically separated by the second time period.

4. The system of claim 3, wherein the first axis is a curved line selected from a group consisting of a circle, a Bezier curve, and a helix.

5. The system of claim 1, wherein each helix portion of the plurality of helix portions is offset in the helical pixel representation based on a corresponding value in the time series data that is represented by the helix portion.

6. The system of claim 1, wherein the processor is further to display the helical pixel representation in a stereoscopic format.

7. A method for providing pixel-based visualizations of time series data using helices, the method comprising:
   identifying, using a processor, a plurality of helix portions in the time series data according to a measured time interval, wherein each of the plurality of helix portions represents the measured time interval in the time series data;
   determining a helical time period to represent a sub-plurality of the helix portions in a helical revolution in a helical pixel representation, wherein the helical revolution is based on a number and position of the sub-plurality of the helix portions;

determining a first axis of the helical pixel representation, wherein proximate helix portions of the plurality of helix portions along a common line parallel to the first axis of the helical pixel representation are chronologically separated by the helical time period;

determining a second axis of the helical pixel representation that is tangent to a path of the helical revolution and associated with a second time period, wherein axially proximate helix portions of the plurality of helix portions with respect to the second axis are chronologically separated by the second time period; and generating the helical pixel representation using the plurality of helix portions.

8. The method of claim 7, further comprising modifying an orientation of the first axis of the helical pixel representation in response to user input that is obtained by a three-dimensional (3D) user interface.

9. The method of claim 7, wherein the first axis is a curved line selected from a group consisting of a circle, a Bezier curve, and a helix.

10. The method of claim 7, wherein each helix portion of the plurality of helix portions is offset in the helical pixel representation based on a corresponding value in the time series data that is represented by the helix portion.

11. The method of claim 7, further comprising displaying the helical pixel representation in a stereoscopic format.

12. A non-transitory machine-readable storage medium encoded with instructions executable by a processor for providing pixel-based visualizations of time series data using helices, the machine-readable storage medium comprising instruction to:

identify a plurality of helix portions in the time series data according to a measured time interval of the time series data;

determine a helical time period to represent a sub-plurality of the helix portions in a helical revolution in a helical pixel representation, wherein the helical revolution is based on a number and position of the sub-plurality of the helix portions:

generate the helical pixel representation using the plurality of helix portions, wherein proximate helix portions of the plurality of helix portions along a common line parallel to a first axis of the helical pixel. representation are chronologically separated by the helical time period; and modify an orientation of the first axis of the helical pixel representation in response to user input that is obtained by a three-dimensional (3D) user interface.

13. The non-transitory machine-readable storage medium of claim 12, wherein the first axis is a curved line selected from a group consisting of a circle, a Bezier curve, and a helix.

14. The non-transitory machine-readable storage medium of claim 12, wherein generating the helical pixel representation comprises:

determining a second axis of the helical pixel representation that is tangent to a path of the helical revolution and associated with a second time period, wherein axially proximate helix portions of the plurality of helix portions with respect to the second axis are chronologically separated by the second time period.

15. The non-transitor machine-readable storage medium of claim 12, wherein each helix portion of the plurality of helix portions is offset in the helical pixel representation from the first axis based on a corresponding value in the time series data that is represented by the helix portion.

* * * * *